United States Patent
Mignano et al.

(10) Patent No.: US 9,439,257 B2
(45) Date of Patent: Sep. 6, 2016

(54) MINIMAL COMPONENT HIGH VOLTAGE CURRENT LIMITED AC DIMMABLE LED DRIVER

(71) Applicants: Benedetto Mignano, Wantagh, NY (US); Peter J. Visconti, East Setauket, NY (US); Attila Tetik, New York, NY (US); Fred Katz, Hauppauge, NY (US)

(72) Inventors: Benedetto Mignano, Wantagh, NY (US); Peter J. Visconti, East Setauket, NY (US); Attila Tetik, New York, NY (US); Fred Katz, Hauppauge, NY (US)

(73) Assignee: LSI Computer Systems Inc., Melville, NY (US)

( * ) Notice: Subject to any disclaimer, the term of this patent is extended or adjusted under 35 U.S.C. 154(b) by 0 days.

(21) Appl. No.: 14/567,380

(22) Filed: Dec. 11, 2014

(65) Prior Publication Data

US 2016/0174318 A1   Jun. 16, 2016

(51) Int. Cl.
*H05B 37/00* (2006.01)
*H05B 33/08* (2006.01)

(52) U.S. Cl.
CPC ................... *H05B 33/0845* (2013.01)

(58) Field of Classification Search
CPC .............................. H05B 33/02; H05B 33/08
USPC ......... 315/291, 307, 312, 200 R, 209 R, 246
See application file for complete search history.

(56) References Cited

U.S. PATENT DOCUMENTS

| | | |
|---|---|---|
| 6,477,025 B1 | 11/2002 | Goldbach et al. |
| 6,573,666 B1 | 6/2003 | Killat |
| 7,340,830 B2 | 3/2008 | Liu et al. |
| 8,207,678 B1 | 6/2012 | Mika et al. |
| 8,368,322 B2 | 2/2013 | Yu et al. |
| 8,373,363 B2 | 2/2013 | Grajcar |
| 8,643,308 B2 | 2/2014 | Grajcar |
| 8,698,407 B1* | 4/2014 | Chen .................. H05B 33/0812 315/185 R |
| 2005/0286260 A1 | 12/2005 | Liu et al. |
| 2007/0090488 A1 | 4/2007 | Teng et al. |
| 2012/0212143 A1* | 8/2012 | Esaki ................... H05B 33/089 315/192 |
| 2012/0242239 A1 | 9/2012 | Miskin et al. |
| 2013/0200799 A1 | 8/2013 | Pan |
| 2014/0062333 A1 | 3/2014 | Sonobe |
| 2014/0232289 A1* | 8/2014 | Brandes ............... H05B 33/086 315/250 |
| 2014/0292213 A1* | 10/2014 | Yoon .................. H05B 33/0821 315/192 |
| 2014/0334412 A1 | 11/2014 | Suzuki et al. |
| 2014/0354156 A1* | 12/2014 | Yang .................... H05B 33/083 315/122 |
| 2015/0257211 A1* | 9/2015 | Johnson ............... H05B 33/089 315/121 |

OTHER PUBLICATIONS

PCT Search Report, International Searching Authority, Jul. 30, 2015, pp. 1-9, USA.

* cited by examiner

*Primary Examiner* — Minh D A
(74) *Attorney, Agent, or Firm* — Carter Ledyard & Milburn

(57) ABSTRACT

This invention is suitable for directly driving from an alternating current (AC) line voltage source an array of LED lamps with a minimal amount of ancillary circuitry. Most of the required circuitry is situated within an integrated circuit, which includes a full wave rectifier, transient protection, a current control transistor, a feedback control loop, and overheating protection. The integrated circuit powers a transistor circuit structured as a constant current source to energize individual groupings of LEDs, as well as larger configurations of LEDs. The invention is useful for various lighting arrangements such as luminaires, bollards, strip lights, task lights, lighting tubes, and other types of applications that use a multitude of LEDs powered directly by AC line voltage without the requirement of a direct current power supply. This invention may further be used with an external phase switching dimmer apparatus.

10 Claims, 9 Drawing Sheets

DETAILED SYSTEM BLOCK DIAGRAM

SYSTEM STRUCTURE

FIG. 1

LED DRIVE CIRCUIT

FIG. 2

BLOCK DIAGRAM

FIG. 3

CURRENT CONTROL SCHEME

FIG. 4

SURGE PROTECTION DEVICES NOT SHOWN ON THIS SIMPLIFIED VIEW

SCHEMATIC DIAGRAM

FIG. 5

DETAILED SYSTEM BLOCK DIAGRAM

FIG. 6

MORE DETAILED BLOCK DIAGRAM

FIG. 7

WAVEFORMS
FIG. 8

SINGLE LED ASSEMBLY SCHEMATIC

FIG. 9A

FOUR SINGLE LED ASSEMBLIES FORMED INTO AN ARRAY

FIG. 9B

TYPICAL LED ASSEMBLY PHYSICAL VIEW

FIG. 9C

6 LEDs FOR A SINGLE MODULE

FIG. 9D

MINIMAL COMPONENT HIGH VOLTAGE CURRENT LIMITED AC DIMMABLE LED DRIVER

FIELD OF THE INVENTION

The present invention relates to lighting systems, and particularly to an improved system and method for powering groups of Light Emitting Diodes (LEDs).

BACKGROUND OF THE INVENTION

This invention was based on a lack in the prior art and thus a requirement to develop a modular LED (Light Emitting Diode) Driver product that is simple, has a low parts count, and is inexpensive to manufacture. Existing products contain a single high power full wave rectifier, followed by an array of LEDs surrounded by ancillary drive circuit components. There exists a need for a configuration such that the AC power is connected to an integrated circuit that feeds groups of LEDs. For market purposes, the amount of LED groups utilized in an application must be expandable (i.e., adjustable without affecting any external full wave rectifier) in order to establish a custom installation of the required LED count. Custom installation may be either in an individual residential or industrial location, or in a mass produced light fixture. Since the amount of LEDs varies from configuration to configuration, it is either necessary to have a wide range of power plug/rectifier units, with power capacity dedicated to different length/configurations or to use one expensive, higher powered rectifier assembly. In addition, multiple components associated with each LED assembly have to be used. Furthermore, space and manufacturability is critical to maintaining market share and thus the utilization of an integrated circuit as a critical component, as described in the present disclosure, provides a solution.

SUMMARY OF THE INVENTION

This invention embodies an approach where an integrated circuit that can accommodate AC line voltage, comprising a self-contained full wave bridge rectifier, is used to power a series combination of LEDs directly from the AC line voltage and with a minimum of ancillary components. This has an advantage over approaches using the LEDs for the function of the rectifier, which engenders problems where the LEDs have to accommodate twice the current through them, since they are non-conductive over half of the time and also would have to cope with large reverse breakdown voltage stress. In addition, having built in rectifiers in each grouping of LEDs (i.e., in each module), rather than one large rectifier bridge, reduces the limitations of the extensibility quality in order to be able to accommodate different size implementations of the module groups that would be present compared to using a single rectifier bridge in the front end of the construction. This concept allows for the construction of many different sizes of LED lighting fixtures that are easily scalable in size with a minimum of discrete electrical components.

BRIEF DESCRIPTION OF THE DRAWINGS

FIGS. 9A, 9B, 9C, and 9D are various example drawings relating to LED assemblies according to the present invention.

DETAILED DESCRIPTION OF THE INVENTION

The present invention discloses systems, methods, and devices which eliminate the requirement for a physical rectifier assembly by instead including a full wave rectifier inside an integrated circuit package. The integrated circuit package also has the majority of other necessary circuitry within it. Each group of LEDs is driven by a single integrated circuit that contains enough rectifier capacity for that group of LEDS. As the physical length of the LED light array is expanded for other configurations, the rectifier capacity increases since the integrated circuits contain the rectifier within each, and as the product is scaled larger, the rectification resource expands as required. Since the majority of the electronic circuitry is contained within the integrated circuit, inventory parts count, circuit board real estate, and price are reduced. The only limitation on the size of the light (LED) array is defined by the wire size used within the particular fixture assembly, used to feed AC power forward. The present invention thus removes any restriction due to a fixed power capacity rectifier component. When there is a single fixed power rectifier, it is rated for a particular power rating, which cannot be exceeded. This limits the size of the lighting topology. The light array can be powered by forward fed power lines which are arranged in a 'star' configuration. A star configuration, in this case, means that all groups are powered in parallel from the AC power source. The invention is also designed for use with an external dimmer.

This invention is based on the concept of the use of two main types of components a Power Conditioning Module 56 and "Light Modules" 55, plus an input connection 52. The input connection 52 may be an ordinary AC outlet plug, a pair of wires, either stripped or unstripped, or some other type of termination hardware suitable to bring in power to the complete assembly. The Power Module 56 consists of any line protection components and discrete transient and circuit protection circuitry that is necessary to prevent any damage to any of the invention's components due to transient voltage excursions that may occasionally occur on an AC power line. The other components, any number of which may be combined together, is a Light Module 55 ("cell") comprising LEDs and electronics. Light Modules 55 may be designed and coupled as required based on the particular size and configuration of the entire light array desired.

Figure 1:
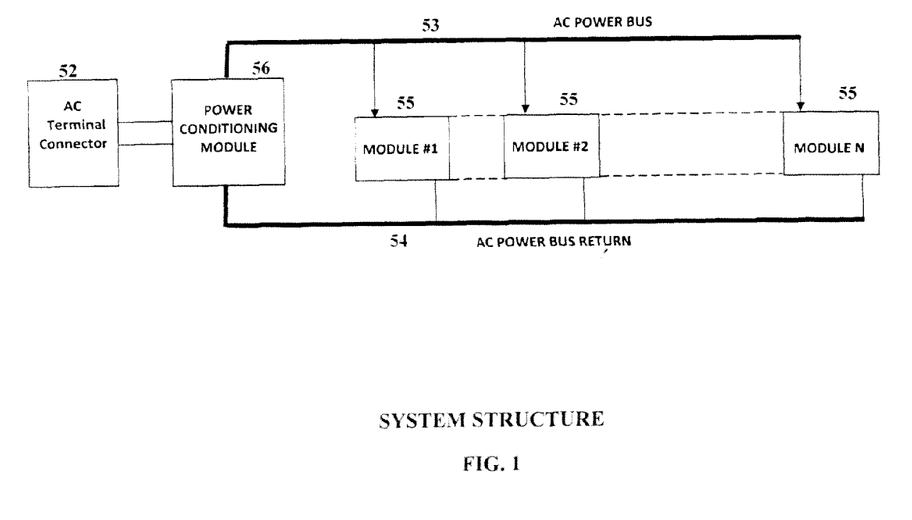
FIG. 1 is a basic illustration of the system structure of the present invention.

FIG. 1 shows a string of 'N' Light Modules 55 connected to a single Power Conditioning Module 56. The light modules 55 may, for example, repeat every four inches. Physically, each Light Module can linearly follow the previous Light Module, or all of the modules can be connected in a parallel (star) configuration. Power to each Light Module is provided through the AC Power Conditioning Module 56 via an AC Power Bus Line 53 and an AC Power Bus Return Line 54. The AC Power Conditioning Module 56 may comprise a single surge protection device, such as an MOV, and a capacitor mounted across the AC power input or other additional components as required. This Power Conditioning Module 56 protects from potential undesirable overvoltage conditions that may damage the Light Modules 55. The two AC Power Bus Lines 53 and 54 extend throughout the entire length of the circuit. If required, short lengths of the array (groups) can be fitted with a connector such that multiple sections which consist of a group of Light Modules 55 can be added, as required for the application, without having to select a different Power Conditioning Module. The value of any fuse can be changed for larger configurations.

Figure 2:
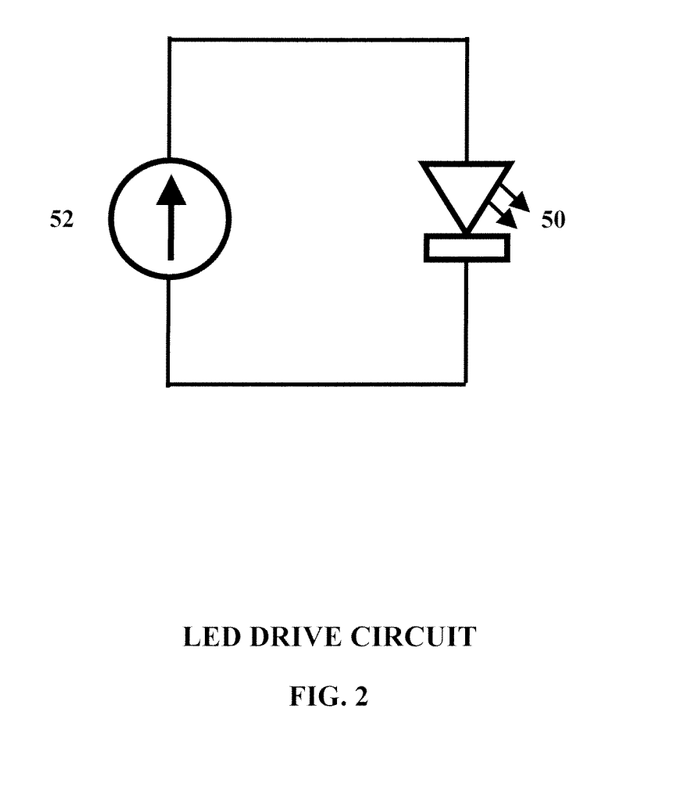
FIG. 2 shows how an LED is driven by a current source.

FIG. 2 illustrates how an LED 50 is driven by an ideal current source 52. A current source may comprise an ideal voltage source in series with a resistor, or it may comprise a voltage source with other types of current-limiting devices, such as feedback controlled transistors. In one embodiment of the present invention, a feedback controlled transistor concept is implemented to power a string of LEDs with a controlled current source. A feedback controlled current source is a preferred type of current source geometry, rather than a series resistor current source, which does not ensure a fixed value of current, in the event that the line voltage undergoes a power surge.

Figure 3:
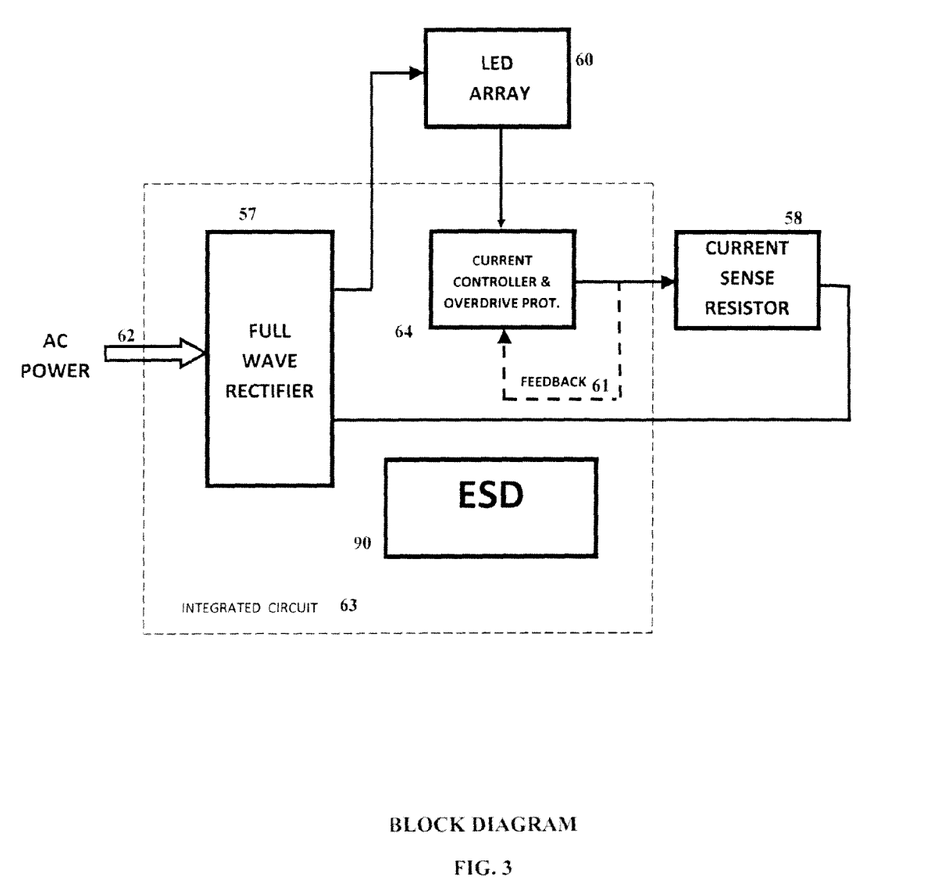
FIG. 3 is a top level view of the LED drive circuitry of the present invention.

FIG. 3 shows the current path of the AC Power 62 which comes in as an alternating current. First, the current passes through a Full Wave Rectifier 57. Then, the current passes through an LED array 60, then through a Current Controller 64 (and overdrive protector), and then through a Current Sense Resistor (or current monitoring resistor) 58, finally returning to the Full Wave Rectifier 57. The current passing through the Current Sense Resistor 58 creates a voltage, which is fed back 61 to the Current Controller 64 to reduce the current value to reach a proper quiescent current flow based on the circuit design. Thus, the integrated circuit comprises a Full Wave Rectifier 57 and a Current Controller 64 (and overdrive protector) with feedback circuitry 61. In addition, ESD protection (Electrostatic Discharge protection) circuitry 90 is included within the integrated circuit to protect the circuitry in the event of a transient or static discharge during handling.

Figure 4:
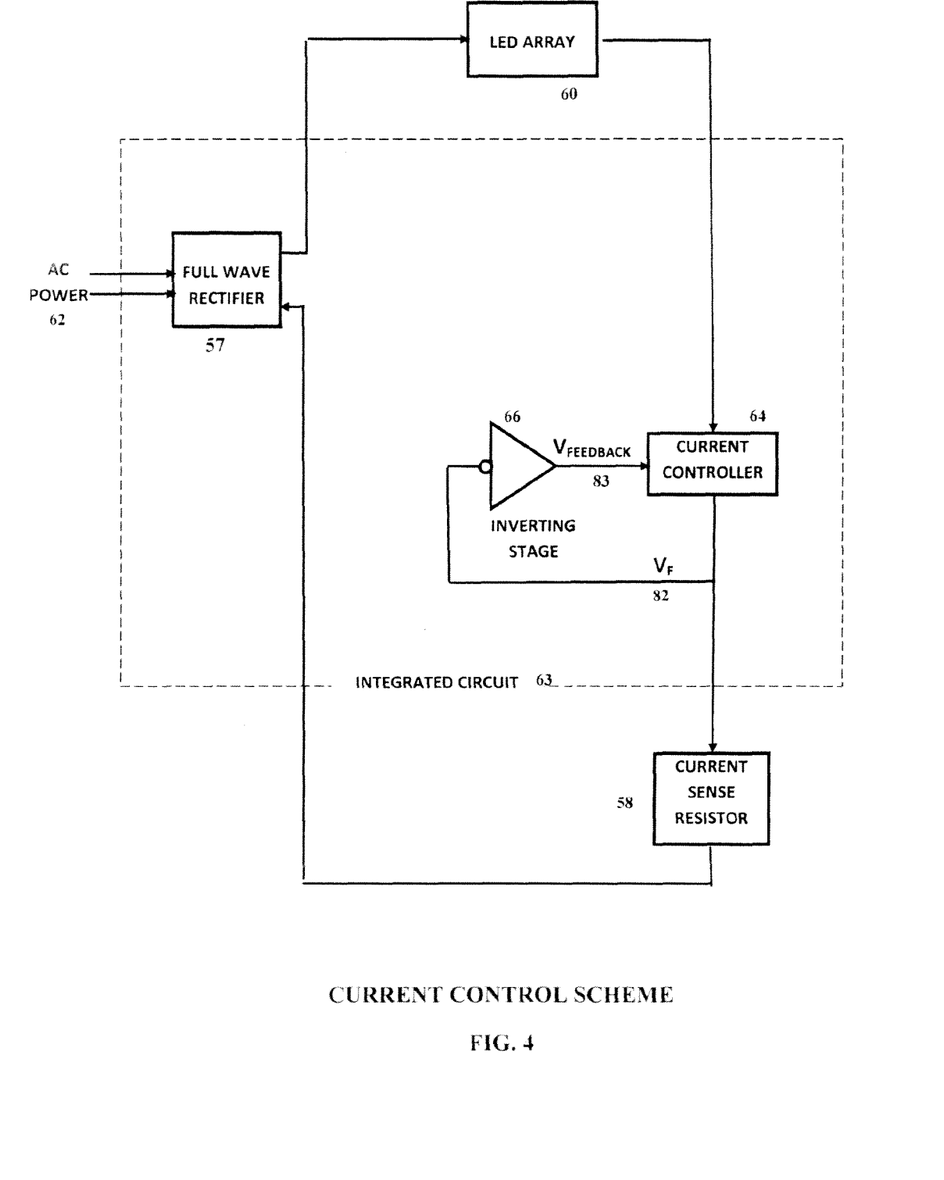
FIG. 4 shows how the feedback circuitry is structured to control the current according to the present invention.

FIG. 4 shows more detail of the feedback (control) circuitry 61 shown in FIG. 3. The voltage developed across the Current Sense Resistor 58 is designated as $V_F$ 82. This developed voltage 82 is applied to an analog inverting stage 66, and the resulting voltage, designated as $V_{FEEDBACK}$ 83, is applied back to the Current Controller 64. As $V_F$ increases, $V_{FEEDBACK}$ decreases, thus reducing the current passing through the LED Array 60, Current Controller 64, and Current Sense Resistor 58. A design incorporating feedback circuitry (control circuitry) thus establishes a stabilized current at a pre-determined equilibrium point. The control circuitry may further comprise a voltage inverter transistor circuitry.

Figure 5:
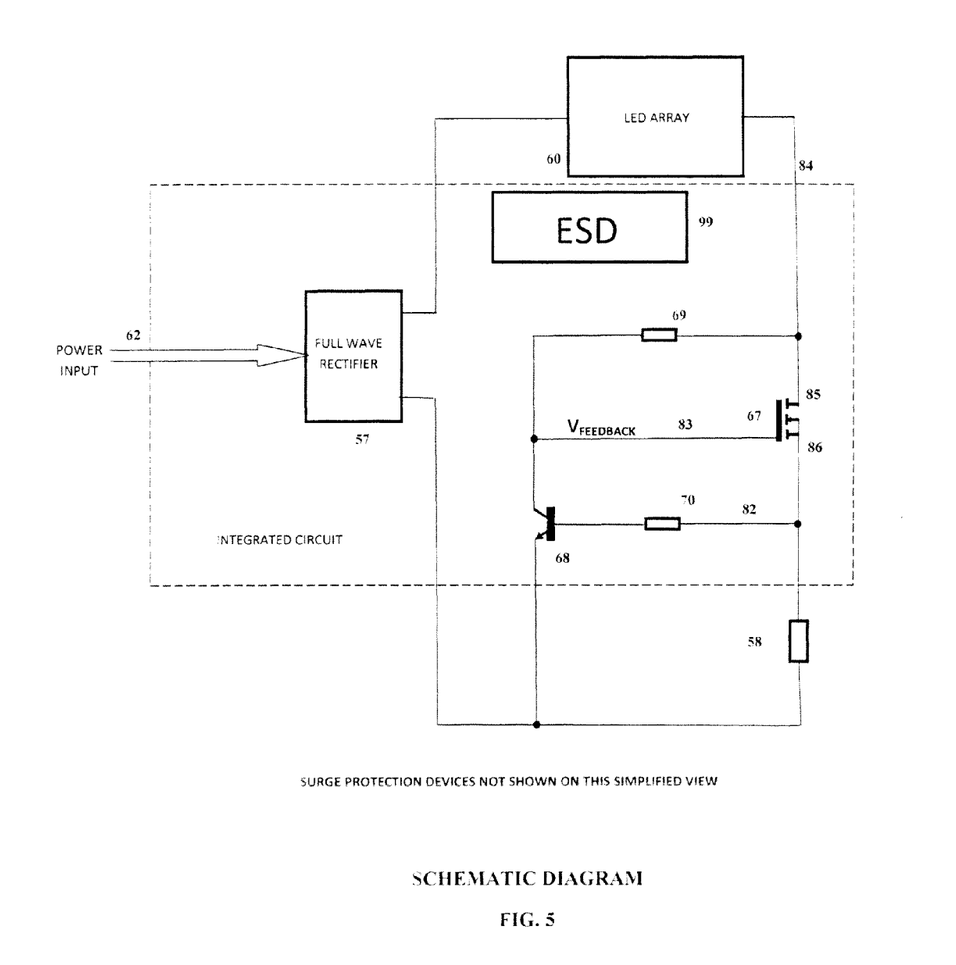
FIG. 5 shows an example of the control circuitry according to the present invention, simplified by the omission of a protection circuit for optimal illustration of the actual circuitry.

FIG. 5 is a further view of an embodiment of the invention including details of the circuitry within the Current Controller 64. All protection devices have been removed from this view for the purposes of clarity. The current control operation can be divided into four consecutive phases within half AC Power's cycle: the OFF period, the Rising Current period, the Regulated Current period, and the Falling Current period. The OFF period occurs when the Full Wave Rectifier 57 voltage is below the total voltage drop across the LED Array 60. In this stage, the LED current is equal to zero and the MOS transistor 67 gate to source voltage decreases based on the specific physical characteristics of the whole circuit and its previous Regulated Current condition. The Rising Current period occurs when the Full Wave Rectifier 57 voltage reaches the total voltage drops across the LED Array 60 plus the MOS transistor 67 threshold voltage. At this time, the MOS transistor 67 gate to source voltage increases through the pull-up resistor 69. Consequently, the MOS transistor 67 current increases until it reaches the Regulated Current state condition. The Regulated Current condition is achieved when the majority of the current passing through the LED Array 60, the MOS transistor 67, and the Current Sensing Resistor 58 reaches a constant value. In this phase, the current develops a voltage across the Current Sensing Resistor 58, $V_F$ 82, which forward biases an NPN transistor 68 through a resistor 70. The resulting base current of the NPN transistor 68 proportionally increases the collector current supplied by the output voltage of the LED Array 60 flowing through its pull-up collector resistor 69, decreasing the rate of change of the $V_{FEEDBACK}$ voltage 83 that is then applied to the gate of the MOS transistor 67, which reduces the rate of change of the current flowing in the LED Array 60. This circuit configuration results in a constant current equilibrium condition that is mostly characterized by the ratio between the NPN transistor's 68 base to emitter voltage value and the Current Sensing Resistor 58 value. The constant voltage applied at the gate of the MOS transistor 67 determine a saturation current through the LED Array 60 that is controlled and stabilized independent of the instantaneous voltage value applied during the sine wave excursions, and independent of variations due to line voltage fluctuations during this phase. In the last phase, known as the Falling Current period, the Full Wave Rectifier 57 voltage again reaches a value below the total voltage drop across the LED Array 60. At this point, the main circuit current decreases until it reaches the zero value, returning to the OFF stage.

The illustration in FIG. 5 shows the same structure as FIG. 4, with additional detail shown by actual components illustrated instead of circuit blocks. The inverting stage consists of transistor 68 (e.g., a field effect transistor, FET), the associated collector load resistor 69, and a base drive resistor 70. The current controller is the transistor 67. As the current flow through the LED Array 60 increases, when the instantaneous sine wave voltage goes up, the current flow through the current sense resistor 58 increases. This increased current flow through the resistor 58 raises the voltage at point 82. This increased voltage at point 82 increases the base current though transistor 68. More base current through transistor 68 causes an increased collector current flow through transistor 68. This increased current flow through it's' collector resistor 69 results in a voltage drop across resistor 69 which causes the value of $V_{FEEDBACK}$ 83 to drop. As $V_{FEEDBACK}$ 83 drops at the gate of transistor 67, the current flow through transistor 67 drops. This negative feedback design results in the circuitry quickly attaining a quiescent state for a constant current flow through the LED Array 60. As the instantaneous sine wave voltages increases and decreases, this circuitry keeps the current through the LED Array 60 constant.

Figure 6:
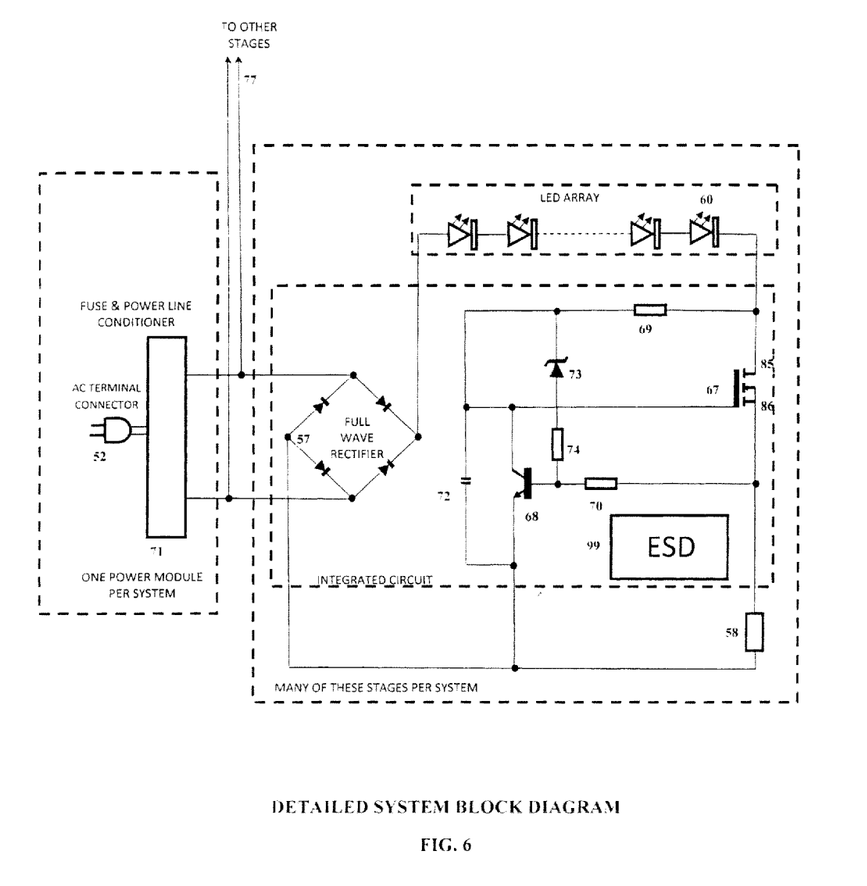
FIG. 6 is a more detailed circuitry that shows one example of MOS Overdrive protection circuit schemes according to the present invention.

FIG. 6 shows the circuitry of FIG. 4 and FIG. 5 in even finer detail with the inclusion of an overdrive (serge) protection circuit. During normal operation, the voltage is such that there is no current conduction through zener diode 73 and limiting resistor 74. If there is a dangerous voltage spike, voltage surge or excursion that exceeds the zener breakdown voltage rating of zener diode 73, the zener diode starts conducting current through resistor 74. The voltage that develops across resistor 74 and zener diode 73 causes the voltage at the base of transistor 68 to increase. This causes an increase in the base current of transistor 68. This increased base current in transistor 68 results in an increased collector current in transistor 68. Increased collector current in transistor 68 draws additional current through resistor 69 which increases the voltage drop across resistor 69. This increased voltage drop across resistor 69 drops the gate voltage of transistor 67 which reduces the current flow through transistor 67 and the LED Array 60, preventing damage due to the voltage surge. The overdrive protection circuit's main function is to clamp the gate voltage of transistor 67 to the source voltage of the MOS transistor 67 below the MOS breakdown voltage and its power dissipation capability, by saturating the zener diode 73 and a current limiter resistor 74. In addition, capacitor 72 shunts the feedback transistor 68. This reduces a transient spike in the $V_{FEEDBACK}$ 83 causing the MOS transistor 67 to instantaneously turn, which would lead to a heavy flow of current through the circuit.

Another important feature of the invention is its inherent thermal protection capability. The NPN transistor's 68 location and characteristics in the integrated circuit are designed to reduce the LED Array's 60 current when the overall system junction temperature increases, due to the total power dissipation of the system (Full Wave Rectifier 57, LED Array 60, MOS transistor 67), above the normal operation condition. The NPN transistor's 68 saturation current depends mostly to its junction temperature and affects its base to emitter voltage ($V_{be}$). For example, the Current Sensing Resistor 58 ($R_{Isense}$) is set to 60 ohms, the integrated circuit junction temperature reaches an equilibrium point of 100° C. and the NPN transistor's 68 $V_{be}$ is equal to 600 mV when the ambient temperature is 25° C. At this point the regulated current value is equal to 10 mA (600 mV/60 ohms). If the ambient temperature increases to 45° C. ($\Delta T = 45° C. - 25° C. = 20° C.$) and the NPN transistor's 68 $V_{be}$ temperature coefficient ($V_{beTcoff}$) is −6 mV/° C., the LED Array's 60 regulated current will be reduced to 8 mA as per the following equation:

Regulated current=$[V_{be@25° C.}+(V_{beTcoff}*\Delta T)]/R_{Isense}=$
[600 mV+(−6 mV/° C.*20° C.)]/60 ohms=8 mA The decrease in current reduces the overall system power dissipation. In order to optimize this temperature control feature, transistor 68 can be designed in the layout architecture to physically be close or even adjacent to transistor 67 so as transistor 67 heats up, transistor 68 also heats up and will reduce the $V_{be}$ voltage, which will cool down transistor 67, as transistor 67 reduces its through current. In addition, the Current Sensing Resistor's 58 temperature coefficient can be used also to enhance the above thermal overload protection schema. This will eventually reach a thermal/electrical equilibrium which will prevent damage from occurring due to an overheat condition, possibly precipitated by environmental temperature change or mounting location effects.

Figure 7:
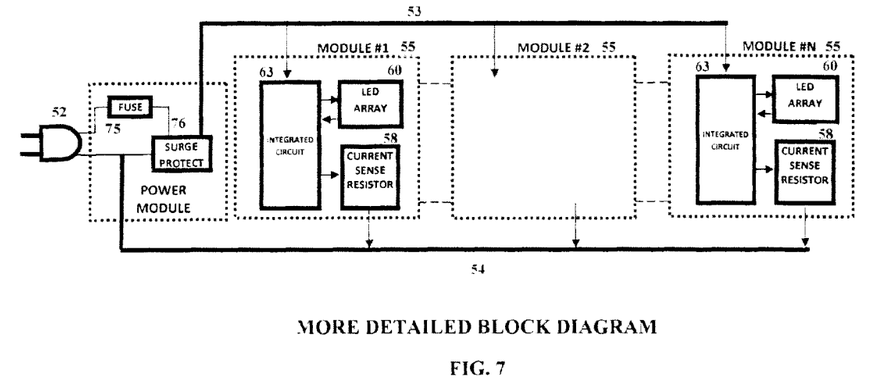
FIG. 7 offers a more detailed block diagram than that of FIG. 1, showing multiple LED groups concatenated with a single power module.

FIG. 7 is a more detailed block diagram of the entire apparatus, as shown in FIG. 1. The AC Terminal Connector 52 (e.g., a line plug) feeds a fuse device 75, and then surge protection circuitry 76 is used to ameliorate the effects of voltage transients and ESD events. Typical surge protection can be a capacitor and an MOV across the line after the fuse. An MOV is a Metal-Oxide Varistor, which is a two leaded component with a non-linear resistance. At high voltages, the MOV has low resistance and at low voltage has a high resistance. When a transient voltage, which is a high voltage, comes through the MOV, its resistance decreases and it shunts the high voltage to ground, keeping the light modules 55 from experiencing a high voltage. Other types of protection devices can be used which perform the same function. The fuse is used to open up the circuit if there is an input voltage level fault or a component or wiring fault that causes too much current to flow, which would be a fire hazard. A physical fuse or a circuit breaker device can be used to protect the invention by opening and stopping current flow if a current value beyond the design parameters is experienced. Since an MOV and other devices take a finite time to activate, a capacitor shunting them tends to keep the voltage from surging for a brief time, which is long enough for the other device to activate and protect.

In the example in FIG. 7, there are a total of N modules, where N is a number between 1 and the maximum amount of stages that can be supplied safely by the wiring and fusing. It is to be noted that the use of a fuse is dependent upon the electrical codes for the particular product. The Power Bus Line 53 and Power Bus Return Line 54 supply each of the modules. These modules consist of an integrated circuit 63, which has a current path that flows from the rectified power source within the integrated circuit 63, through the MOS pass transistor 67, and into an LED Array 60. The current then flows to the Current Sense Resistor 58 and back to the Power Bus Return Line 54. In addition, there are some discrete circuit components 77 for protection of the circuitry from rapid current rise, as well as transient and ESD protection. Each of the Light Modules 55 are identical to each other but different from the Power Module 76.

Figure 8:
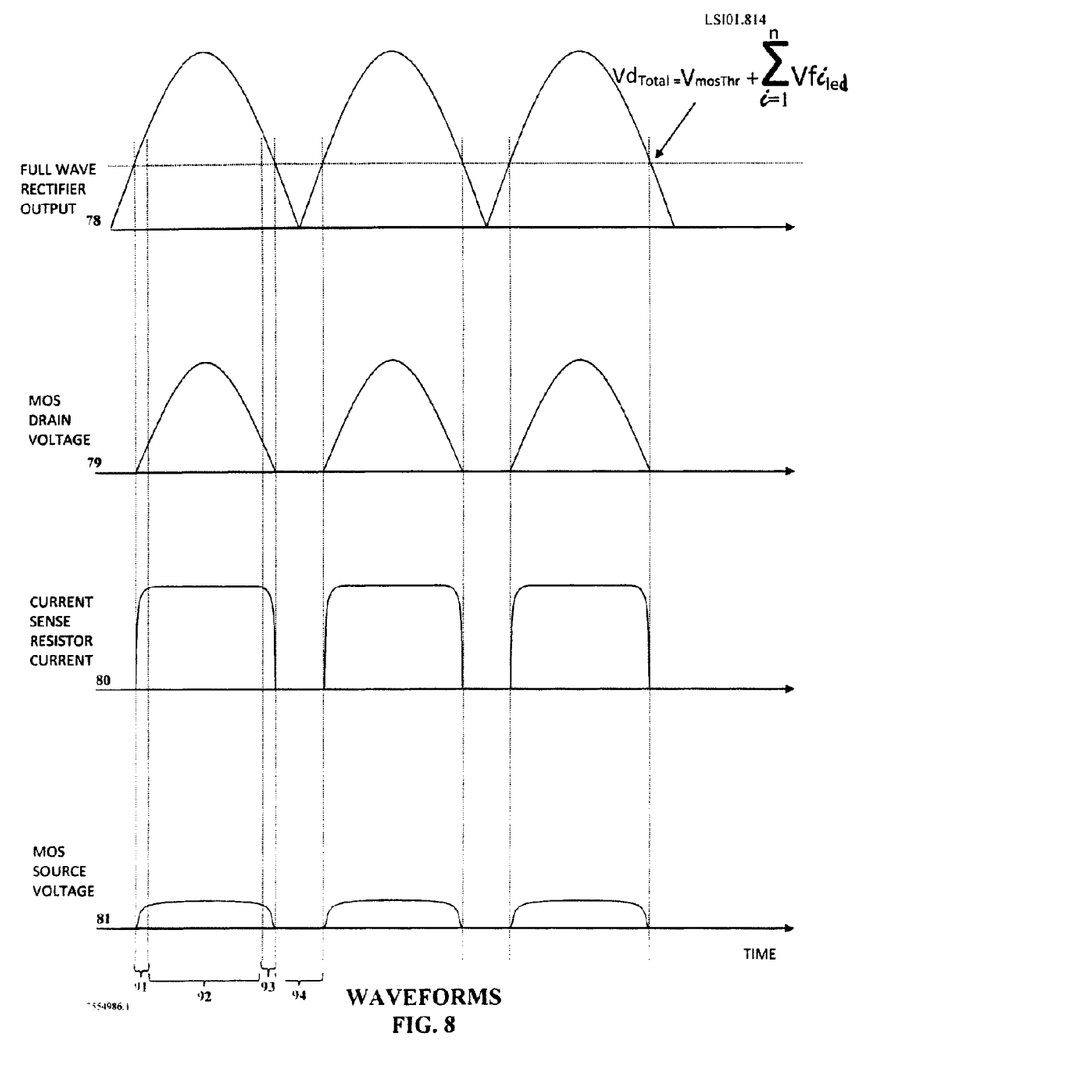
FIG. 8 illustrates examples of the resulting waveforms generated by the circuitry of the present invention when operating.

FIG. 8 displays some waveforms that occur during normal circuit operation. Trace 78 is the output voltage of the Full Wave Rectifier 57. The current through the Current Sense Resistor 58 is shown as trace 80, which shows that there is no current flow during the lower voltage portions of the sine wave. Once a threshold voltage, $Vf_{leds}$, is reached, at the point that the total voltage drop across the LED Array 60 ($\Sigma Vfi_{led}$) plus the MOS transistor 67 threshold voltage (VmosThr) is exceeded ($Vd_{Total}$), the current slowly approaches the quiescent value and is flat even though the sine wave line voltage is increasing. This is due to the feedback nature of the circuitry and its action as a constant current source. Current conduction will only occur once the instantaneous sine wave voltage exceeds the sum of voltage drops across the LED Array 60. Trace 79 shows the Drain Voltage 85 from the MOS transistor 67 (see FIGS. 5 and 6). Trace 81 shows the Source Voltage 86 (see FIGS. 5 and 6), which reflects the voltage across the Current Sense Resistor 58. Once the input power's AC waveform has reached a sufficient level such that current can flow through the LED Array 60 and the circuitry can operate, the Source Voltage 86 remains relatively constant. This is because it is directly proportional to the current through the Current Sense Resistor 58. This is the desired type of operation where only a fixed value of current is designed to flow.

The circuitry of this invention is compatible with external dimming circuitry. External dimmers operate by adjusting the duty cycle of the current flow for near maximum light output by permitting nearly fulltime current conduction through the light emitter (LED Array in this invention). This gives near maximum brightness of the LED Array. As the circuit is dimmed, the dimmer control electronics reduces the percentage of time that current is allowed to flow. This is done synchronously with the AC-mains voltage's sine wave. The less percent of the time that current flows, the dimmer the light appears. Typically, the dimmer is switched on during different phases of the sine wave, dependent on the setting of the dimmer control and the desired brightness level of the lamp. For maximum brightness the dimmer circuitry switches on about 25% (near 45° phase angle) of the sine wave and stays on to either a complementary angle on the sine wave or until the sine wave's 180° phase angle occurs when the voltage is at its zero crossing point, dependent on the type of dimmer circuit. As the dimmer control is operated to progressively dim the light, the circuitry turns the light on at a later and later phase angle. The more dimming that is desired by the user, the less time the dimmer circuitry allows current to flow through the light, and this reduces the visual brightness of the light. When a dimmer is used with the invention, the invention appears electronically as a constant current load for the dimmer. When the dimmer switches current on, at a particular sine wave phase angle, the invention allows constant current to flow through the LED Array when the AC voltage is above $Vd_{Total}$. The dimmer looks electrically to the invention's circuitry as a switch that is switching on and off, in synchronism with the main's sine wave voltage and this switched current flow gets regulated by the invention's circuitry to a constant current switching on and off through the inventions regulator circuitry and the LEDs Array. Another important aspect of the invention is that the inrush current is limited by the internal control circuitry and because there are not large capacitors to charge during the on time stage.

Figure 9A:
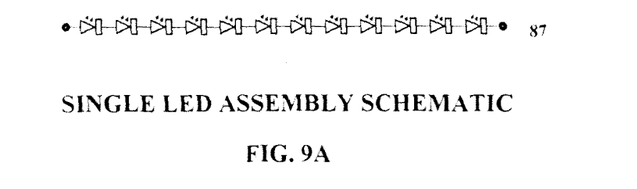
FIG. 9A shows an individual LED assembly.
Figure 9B:
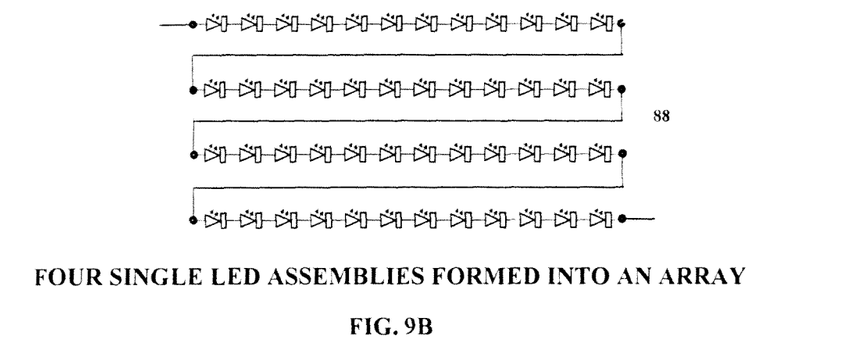
FIG. 9B shows four assemblies combined for an array.
Figure 9C:
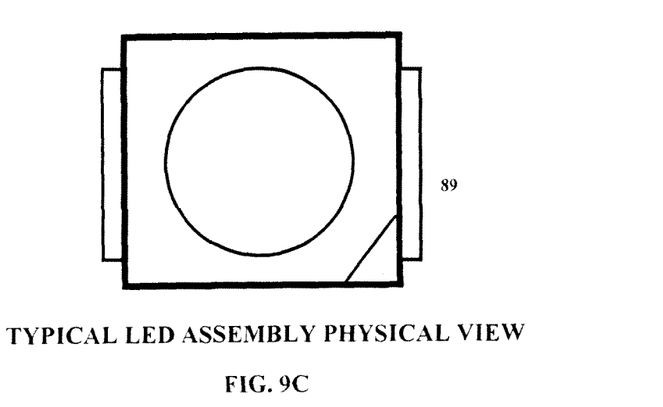
FIG. 9C shows a physical view of one LED.
Figure 9D:
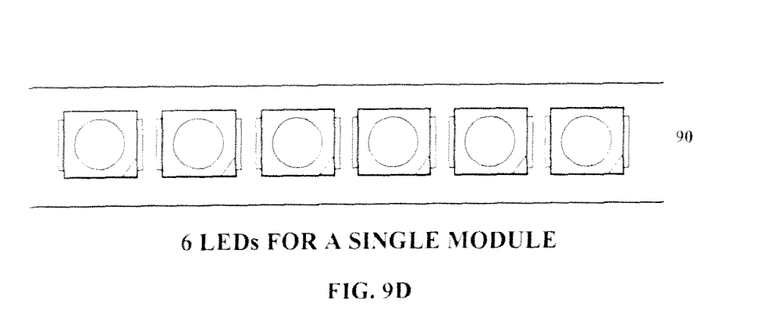
FIG. 9D shows six physical LEDs comprising a single module. The invention is also designed for use with an external dimmer.

FIGS. 9A-9D show schematics 87, 88 and physical views 89, 90 of the LEDs and LED Array components. Each LED Assembly 89 is a mid-power, high voltage type of LED that consists of a multitude of LED junctions assembled into a single physical package. FIG. 9A shows a typical equivalent circuit for a single assembly 87, that consists of a group of individual LED elements connected together serially so as to yield a higher series voltage drop. FIG. 9B shows four of the LED assemblies connected in series 88 to form an LED Array 60, as referred to herein. FIG. 9C shows the physical appearance 89 of a typical LED Assembly. FIG. 9D shows six LED Assemblies situated in an array 90 suitable for a single Light Module application, exemplifying another type of LED Array 60. All of the LEDs in each module are chosen to have similar color and brightness by a matching process called binning by the manufacturer, in order to control the consistency of color temperature and illumination over the entire physical product.

The present invention thus relates to an integrated circuit for powering an LED array, the circuit comprising: a full wave rectifier positioned within said integrated circuit, a field effect transistor (FET) for current control, a current monitoring resistor, a surge protection circuit, and a control circuitry, said control circuitry comprising a constant current source and a voltage inverter transistor circuitry.

In some aspects, the integrated circuit is further coupled to an LED array, forming a light module. In some aspects, the integrated circuit further comprises a connection to one or more light modules. In some aspects, the circuit is modifiable such that a quantity of light modules is adjustable without affecting any type of external full wave rectifier (since the full wave rectifier exists within each light module containing an integrated circuit itself). In some aspects, the circuit is powered only by a single power module, regardless of the number of LEDs or light modules connected. In some aspects, each light module is identical to each other light module.

In some aspects, the circuit internally converts an AC voltage to a full wave rectified AC voltage, thus making the circuit suitable for efficient use as an LED drive source. In some aspects, the circuit is further coupled to an external dimmer. In some aspects, the circuit operates on an AC voltage. In some aspects, the circuit supplies a constant current to an LED array. In some aspects, the circuit further comprises a thermal overload protection circuitry. In some aspects, the circuit further comprises a power bus line and a power bus return line. In some aspects, the circuit further comprises ESD protection. In some aspects, the circuit's surge protection comprises a metal-oxide varistor (MOV) and a capacitor. In some aspects, the circuit creates a constant current equilibrium condition through the LED array (as described in greater detail above). The present invention also entails an LED strip comprising the integrated circuit described herein.

Furthermore, the present invention also regards a method of building an integrated circuit for powering one or more LED arrays, the method comprising the steps of: positioning a full wave rectifier within an integrated circuit, and positioning a field effect transistor (FET) within the same integrated circuit (thus removing the need for any external full wave rectifier). In some aspects, the method further comprises connecting a current sense resistor to the integrated circuit. In some aspects, the method further comprises connecting a surge protection circuit to the integrated circuit. In some aspects, the method further comprises connecting a control circuitry to said integrated circuit, where the control circuitry comprises a constant current source and a voltage inverter transistor circuitry.

While the present invention has been described in conjunction with specific embodiments, those of normal skill in the art will appreciate the modifications and variations can be made without departing from the scope and the spirit of the present invention. Such modifications and variations are envisioned to be within the scope of the appended claims.

The invention claimed is:

1. An improved lighting system comprising a plurality of integrated circuit modules serially connected to a single power module, each integrated circuit module also connected to an LED array and further including a dedicated full wave rectifier element, a thermal protection element, and a surge protection element, all of said elements being internal to and an integral part of each integrated circuit module wherein said serially connected integrated circuit modules providing enhanced scalability not constrained by use of a single full bridge rectifier as a lighting system power source.

2. An improved lighting system in accordance with claim 1 wherein said thermal protection element reduces current flow to said LED array when a predetermined operating temperature for said integrated circuit module is exceeded.

3. An improved lighting system in accordance with claim 2 wherein said thermal protection element includes a current sensing resistor and an NPN transistor having a saturation current and a junction temperature where said saturation current is dependent on said junction temperature.

4. An improved lighting system in accordance with claim 3 wherein an increase in said junction temperature affects said saturation current and in turn affects current flow to said LED array, based in part on the resistance of said current sensing resistor.

5. An improved lighting system in accordance with claim 4 wherein a physical location in which said NPN transistor is placed within said integrated circuit module and can be adjusted to affect current flow to said LED array.

6. An improved lighting system in accordance with claim 1 wherein said surge protection element reduces current flow through said LED array in response to the occurrence of voltage surges applied to said dedicated full wave rectifier.

7. An improved lighting system in accordance with claim 6 wherein said surge protection element includes a zener diode and a limiting resistor, through which there is no current flow during normal operation of said integrated circuit module.

8. An improved lighting system in accordance with claim 7 wherein the occurrence of a voltage surge that exceeds a predetermined breakdown voltage of said zener diode causes current flow through said limiting resistor and said zener diode.

9. An improved lighting system in accordance with claim 8 wherein current flow through said limiting resistor and said zener diode causes current flow through a control resistor which increases a drop in voltage across said control resistor.

10. An improved lighting system in accordance with claim 9 wherein said drop in voltage across said control resistor results in a reduction in current flow through said LED array.

* * * * *